(12) United States Patent
Xin

(10) Patent No.: US 11,444,927 B2
(45) Date of Patent: Sep. 13, 2022

(54) METHOD AND APPARATUS FOR ENCRYPTING DATA

(71) Applicant: HANGZHOU HIKVISION DIGITAL TECHNOLOGY CO., LTD., Zhejiang (CN)

(72) Inventor: Anmin Xin, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 292 days.

(21) Appl. No.: 16/646,761

(22) PCT Filed: Aug. 23, 2018

(86) PCT No.: PCT/CN2018/101900
§ 371 (c)(1),
(2) Date: Mar. 12, 2020

(87) PCT Pub. No.: WO2019/052323
PCT Pub. Date: Mar. 21, 2019

(65) Prior Publication Data
US 2020/0274855 A1     Aug. 27, 2020

(30) Foreign Application Priority Data
Sep. 13, 2017   (CN) .......................... 201710823246.2

(51) Int. Cl.
*H04L 9/40*           (2022.01)
*G06F 21/60*          (2013.01)
(Continued)

(52) U.S. Cl.
CPC ........ *H04L 63/0428* (2013.01); *G06F 21/602* (2013.01); *H04L 65/70* (2022.05); *H04L 69/22* (2013.01)

(58) Field of Classification Search
CPC ... H04L 63/0428; H04L 65/607; H04L 69/22; H04L 9/065; H04L 63/0457; H04L 29/06;
(Continued)

(56) References Cited

U.S. PATENT DOCUMENTS 9,497,459 B2    11/2016  Shen et al.
2005/0108746 A1  5/2005  Futagami et al.
(Continued)

FOREIGN PATENT DOCUMENTS

CN     102333236 A    1/2012
CN     105162588 A   12/2015

OTHER PUBLICATIONS

Office Action of corresponding Chinese Patent Application No. 201710823246.2—16 pages (dated Apr. 1, 2020).
(Continued)

*Primary Examiner* — Mohammad W Reza
(74) *Attorney, Agent, or Firm* — Knobbe Martens Olson & Bear LLP

(57) ABSTRACT

A method and apparatus for encrypting data includes: acquiring a first data unit included in a media frame to be encrypted, wherein the first data unit includes a boundary portion and a content portion, the boundary portion including boundary information for identifying a starting boundary of the first data unit, and the content portion including content data of the first data unit; encrypting the content data included in the content portion of the first data unit to acquire a second data unit, wherein a boundary portion of the second data unit includes the boundary information, and a content portion of the second data unit includes a data length of the content data and encrypted data acquired by encrypting the content data.

20 Claims, 8 Drawing Sheets

(51) Int. Cl.
*H04L 69/22* (2022.01)
*H04L 65/70* (2022.01)

(58) Field of Classification Search
CPC ... H04L 63/0464; G06F 21/602; G06F 21/60; H04N 21/2347; H04N 21/4405
See application file for complete search history.

(56) References Cited

U.S. PATENT DOCUMENTS

| | | | |
|---|---|---|---|
| 2009/0187771 A1* | 7/2009 | McLellan, Jr. | H04L 9/0891 713/193 |
| 2009/0316891 A1 | 12/2009 | Suzuki et al. | |
| 2014/0376719 A1* | 12/2014 | Moroney | H04N 21/47217 380/200 |
| 2017/0364688 A1* | 12/2017 | Desai | G06F 21/6281 |
| 2018/0253559 A1* | 9/2018 | Satpathy | G06F 21/6209 |

OTHER PUBLICATIONS

Jiang, "Real Time Video Transmission Based on H.264 Stream Cipher Encryption Research", Chapter 3 and 4, China Excellent Master's Thesis Full-text Database Information Technology Series, Issue 12—92 pages (Dec. 15, 2012).
Extended European Search Report of EP Patent Application No. 18856094.0—6 pages (dated Oct. 6, 2020).
"Real-time Transport Protocol", Wikipedia, retrieved from <https://en.wikipedia.org/w/index.php?title=Real-time_Transport_Protocol&oldid=799935012>—4 pages (retrieved on Sep. 22, 2020).
Second Office Action of Chinese Patent Application No. 201710823246.2—17 pages (dated Nov. 17, 2020).
International Search Report in PCT application No. PCT/CN2018/101900 dated Oct. 15, 2018.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|NRI|type ( Type ) |                                          |
+-+-+-+-+-+-+-+-+                                               |
|                                                               |
| Payload field                                                 |
|   +-+-+-+-+-+-+-+-+-+-+-+-+-+-+-+-+|                          |
+-+-+-+-+-+-+-+-+-+-+-+-+-+-+-+-+-+-+-+-+-+-+-+-+-+-+-+-+-+-+-+-+
```
FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| FU indicator |    FU header  |
  ( Indicator )    ( Header )
+-+-+-+-+-+-+-+-+-+-+-+-+-+-+-+-+                               |
| FU payload  ( Payload field )                                 |
|   +-+-+-+-+-+-+-+-+-+-+-+-+-+-+-+-+|  :...OPTIONAL RTP padding |
+-+-+-+-+-+-+-+-+-+-+-+-+-+-+-+-+-+-+-+-+-+-+-+-+-+-+-+-+-+-+-+-+
```
FIG. 9

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+
 |    PayloadHdr ( Header )      |
 +-+-+-+-+-+-+-+-+-+-+-+-+-+-+-+-+
 |                    Payload field                            |
 +-+-+-+-+-+-+-+-+-+-+-+-+-+-+-+-+-+-+-+-+-+-+-+-+-+-+-+-+-+-+-+
```
FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|PayloadHdr (Type=49) ( Load header ) |FU header ( Header ) |   |
+-+-+-+-+-+-+-+-+-+-+-+-+-+-+-+-+-+-+-+-+-+-+-+-+-+-+-+-+       |
|                          Payload field                        |
+-+-+-+-+-+-+-+-+-+-+-+-+-+-+-+-+-+-+-+-+-+-+-+-+-+-+-+-+-+-+-+-+
```

_US 11,444,927 B2_

METHOD AND APPARATUS FOR ENCRYPTING DATA

This application is a National Phase of the International Application No. PCT/CN2018/101900, filed on Aug. 23, 2018 and entitled "METHOD AND APPARATUS FOR ENCRYPTING DATA", which claims priority to Chinese Patent Application No. 201710823246.2, filed with the National Intellectual Property Administration, PRC on Sep. 13, 2017 and entitled "METHOD AND APPARATUS FOR ENCRYPTING DATA", the entire contents of which are incorporated herein by reference.

TECHNICAL FIELD

The present disclosure relates to the field of communications, and more particularly, relates to a method and apparatus for encrypting data.

BACKGROUND

With the rapid development of streaming media, more and more audio and video data are generated, wherein security of the audio and video data is important. For security of the audio and video data, the audio and video data needs to be encrypted.

SUMMARY

Embodiments of the present disclosure provide a method and apparatus for encrypting data. The technical solutions are as follows:

According to an aspect of embodiments of the present disclosure, a method for encrypting data is provided. The method includes:

acquiring a first data unit included in a media frame to be encrypted, wherein the first data unit includes a boundary portion and a content portion, the boundary portion includes boundary information for identifying a starting boundary of the first data unit, and the content portion includes content data of the first data unit; and encrypting the content data included in the content portion of the first data unit to acquire a second data unit, wherein a boundary portion of the second data unit includes the boundary information, and a content portion of the second data unit includes a data length of the content data and encrypted data acquired by encrypting the content data.

Optionally, after encrypting the content data included in the content portion of the first data unit to acquire the second data unit, the method further includes:

generating a first media packet including the second data unit when the content data is parameter information of the media frame, wherein a header field of the first media packet includes a timestamp of the media frame and a packet sequence number of the first media packet, and a load field of the first media packet includes the second data unit.

Optionally, the load field of the first media packet includes an identification code in the boundary information and the content portion of the second data unit.

Optionally, after encrypting the content data included in the content portion of the first data unit to acquire the second data unit, the method further includes:

generating a second media packet when the content data is media data of the media frame, wherein a header field of the second media packet includes a timestamp of the media frame and a packet sequence number of the second media packet, and a load field of the second media packet includes first identification information for identifying the second media packet as a starting packet, the boundary information and a part of data intercepted from a starting position of the content portion of the second data unit.

Optionally, the load field of the second media packet includes an indicator, a header and a payload field, the header is located between the indicator and the payload field, and the boundary information includes an identification code including a first part of content and a second part of content; and wherein the indicator includes the first part of content, the header includes the second part of content and the first identification information, and the payload field includes the part of data intercepted from the starting position of the content portion of the second data unit.

Optionally, the load field of the second media packet includes a header and a payload field, the header is located before the payload field, and the boundary information includes an identification code;

wherein the header includes the middle 6-bit content of a first byte of the identification code and the first identification information, and the payload field includes the part of data intercepted from the starting position of the content portion of the second data unit.

Optionally, after generating the second media packet, the method further includes:

when a length of unintercepted remaining data included in the content portion of the second data unit exceeds a preset threshold, intercepting a part of data from the starting position of the remaining data;

generating a third data packet and returning to perform the operation of determining whether a length of unintercepted remaining data included in the content portion of the second data unit exceeds a preset threshold, wherein a header field of the third media packet includes a timestamp of the media frame and a packet sequence number of the third media packet, and a load field of the third media packet includes second identification information for identifying the third media packet as an intermediate packet and the intercepted part of data.

Optionally, the method further includes:

when a length of unintercepted remaining data included in the content portion of the second data unit does not exceed a preset threshold, generating a fourth media packet, wherein a header field of the fourth media packet includes a timestamp of the media frame and a packet sequence number of the fourth media packet, and a load field of the fourth media packet includes third identification information for identifying the fourth media packet as an ending packet and the remaining data.

According to another aspect of embodiments of the present disclosure, an apparatus for encrypting data is provided. The apparatus includes:

an acquiring module, configured to acquire a first data unit included in a media frame to be encrypted, wherein the first data unit comprises a boundary portion and a content portion, the boundary portion includes boundary information for identifying a starting boundary of the first data unit, and the content portion includes content data of the first data unit; and an encrypting module, configured to encrypt the content data included in the content portion of the first data unit to acquire a second data unit, wherein a boundary portion of the second data unit includes the boundary information, and a content portion of the second data unit includes a data length of the content data and encrypted data acquired by encrypting the content data.

Optionally, the apparatus further includes a first generating module, configured to generate a first media packet including the second data unit when the content data is parameter information of the media frame, wherein a header field of the first media packet includes a timestamp of the media frame and a packet sequence number of the first media packet, and a load field of the first media packet includes the second data unit.

Optionally, the load field of the first media packet includes an identification code in the boundary information and the content portion of the second data unit.

Optionally, the apparatus further includes:

a second generating module, configured to generate a second media packet when the content data is media data of the media frame, wherein a header field of the second media packet includes a timestamp of the media frame and a packet sequence number of the second media packet, and a load field of the second media packet includes first identification information for identifying the second media packet as a starting packet, the boundary information and a part of data intercepted from a starting position of the content portion of the second data unit.

Optionally, the load field of the second media packet includes an indicator, a header and a payload field, the header is located between the indicator and the payload field, and the boundary information includes an identification code including a first part of content and a second part of content;

wherein the indicator includes the first part of content, the header includes the second part of content and the first identification information, and the payload field includes the part of data intercepted from the starting position of the content portion of the second data unit.

Optionally, the load field of the second media packet includes a header and a payload field, the header is located before the payload field, and the boundary information includes an identification code;

wherein the header includes the middle 6-bit content of a first byte of the identification code and the first identification information, and the payload field includes the part of data intercepted from the starting position of the content portion of the second data unit.

Optionally, the apparatus further includes:

an intercepting module, configured to, when a length of unintercepted remaining data included in the content portion of the second data unit exceeds a preset threshold, intercept a part of data from the starting position of the remaining data; and a third generating module, configured to generate a third media packet and return to perform the operation of determining whether a length of unintercepted remaining data included in the content portion of the second data unit exceeds a preset threshold, wherein a header field of the third media packet includes a timestamp of the media frame and a packet sequence number of the third media packet, and a load field of the third media packet includes second identification information for identifying the third media packet as an intermediate packet and the intercepted part of data.

Optionally, the apparatus further includes:

a fourth generating module, configured to, when a length of unintercepted remaining data included in the content portion of the second data unit does not exceed a preset threshold, generate a fourth media packet, wherein a header field of the fourth media packet includes a timestamp of the media frame and a packet sequence number of the fourth media packet, and a load field of the fourth media packet includes third identification information for identifying the fourth media packet as an ending packet and the remaining data.

According to another aspect of embodiments of the present disclosure, an apparatus for use in encrypting data is provided. The apparatus includes:

one or more processors; and one or more memories;

wherein the one or more memories store program codes, wherein the program codes are executed by the one or more processors to implement the method according to an aspect.

According to another aspect of embodiments of the present disclosure, a non-volatile computer-readable storage medium is provided, which stores a computer program. The computer program is loaded and executed by a processor to execute the instructions of the method according to an aspect.

It is to be understood that both the above general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent the present disclosure and, together with the description, serve to explain the principles of the present disclosure.

Figure 4:
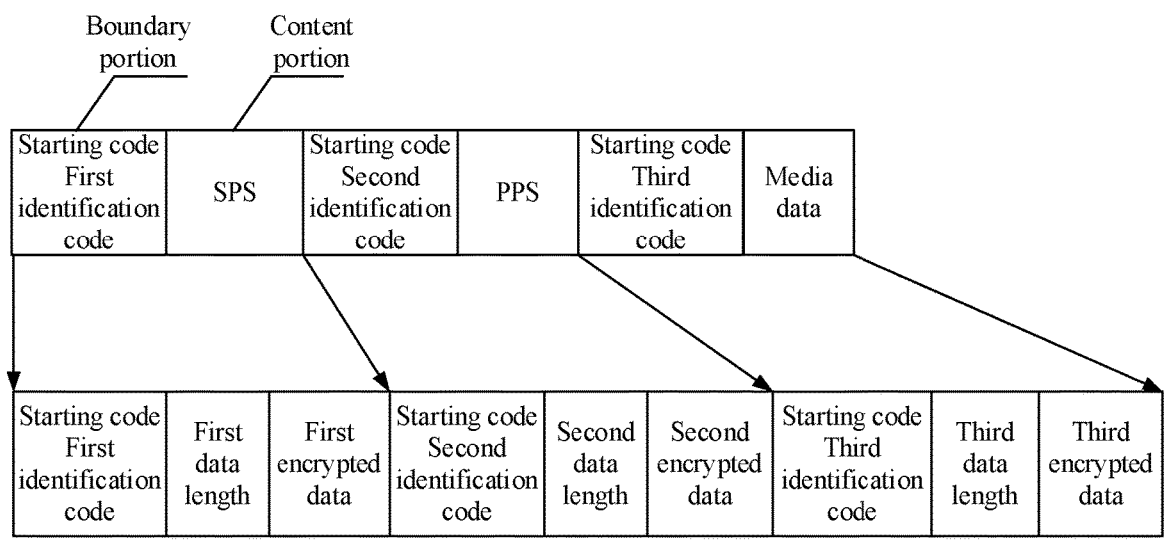
Figure 5:
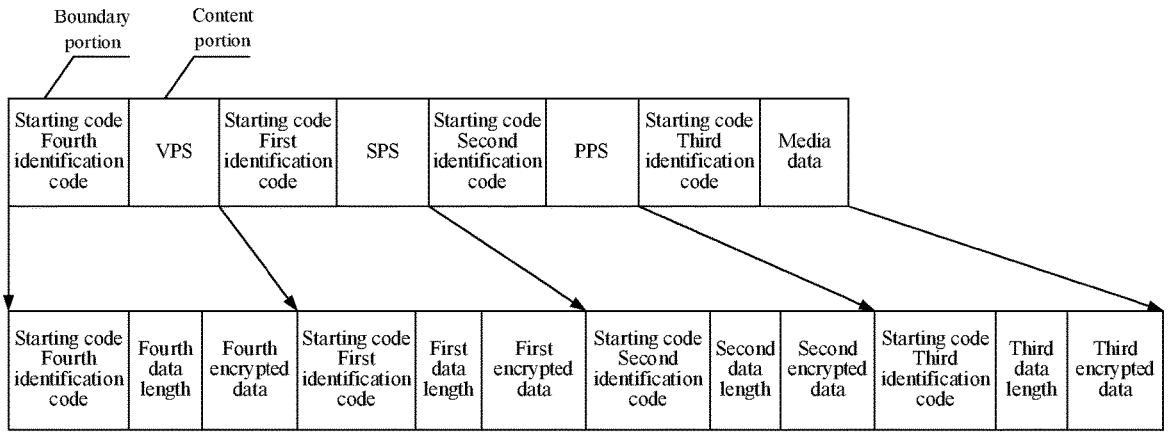
Figure 6:
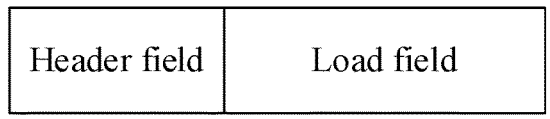
Figure 7:
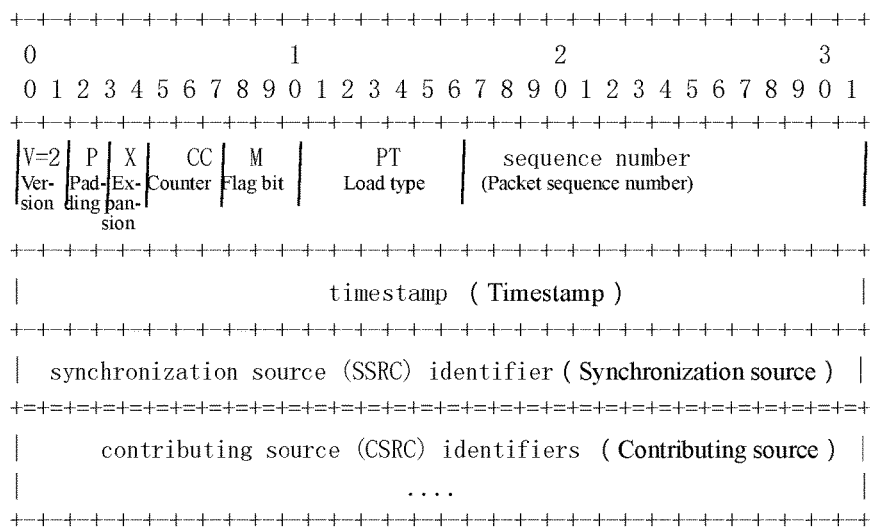
Figures 11, 12:
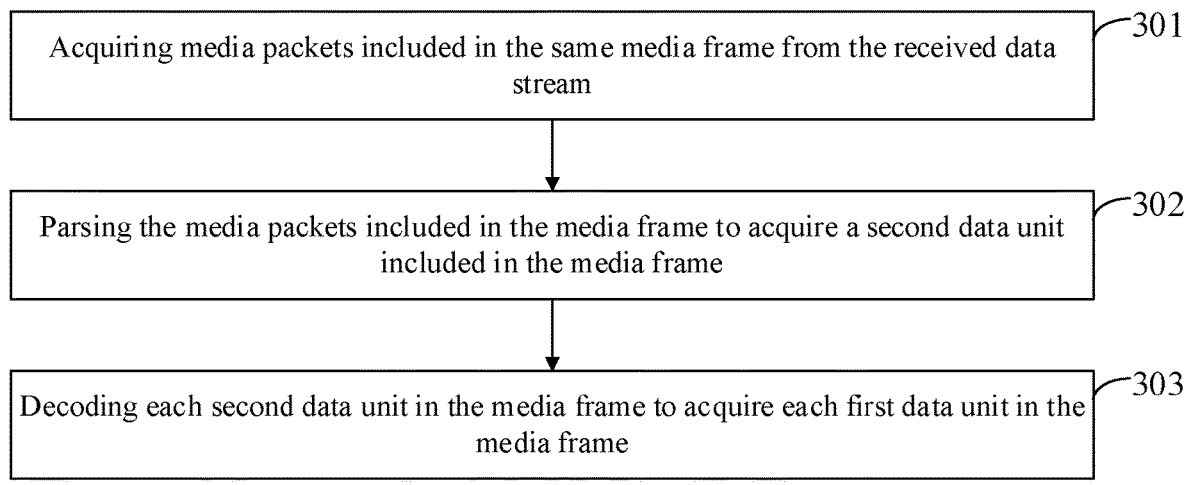
Figure 13:
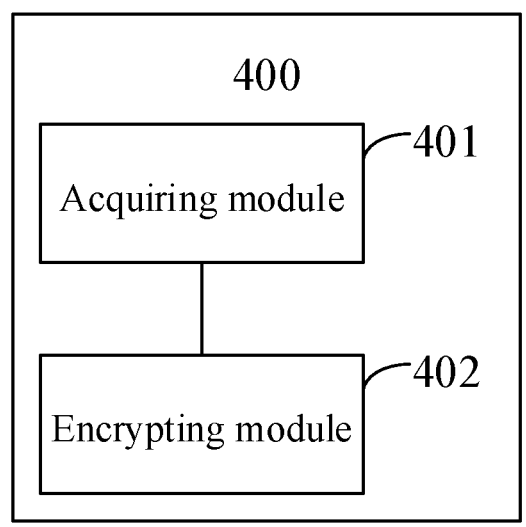
Figure 14:
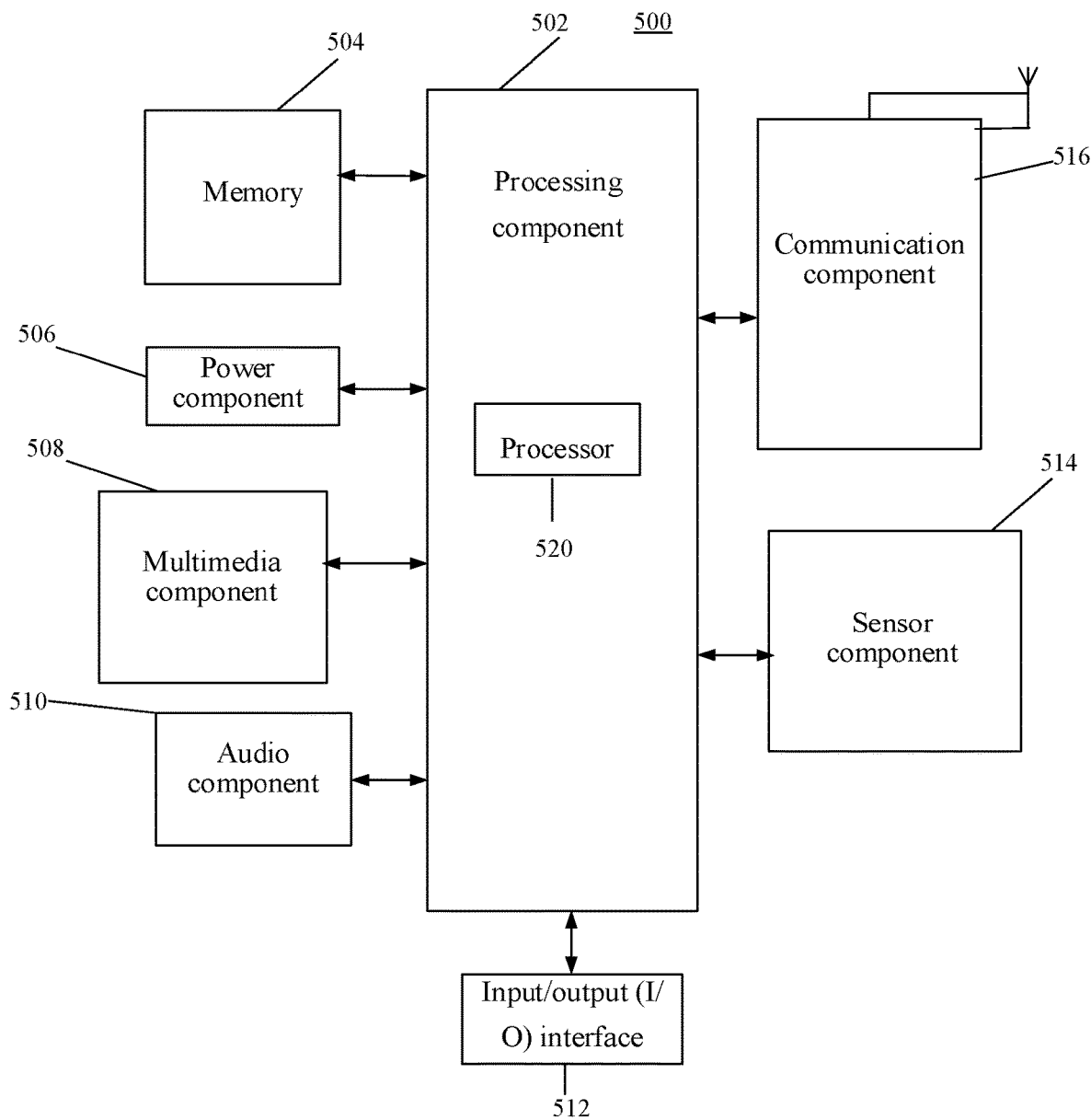

FIG. is a schematic structural diagram of a media frame according to Embodiment 2 of the present disclosure;

FIG. 4 is a schematic structural diagram of a media frame in an H.264 encoding mode according to embodiments of the present disclosure;

FIG. 5 is a schematic structural diagram of a media frame in an H.265 encoding mode according to embodiments of the present disclosure;

FIG. 6 is a schematic structural diagram of a media packet according to embodiments of the present disclosure;

FIG. 7 is a schematic structural diagram of a header packet according to Embodiment 2 of the present disclosure;

FIG. 8 is a schematic structural diagram of a first load according to embodiments of the present disclosure;

FIG. 9 is a schematic structural diagram of a second load field according to Embodiment 2 of the present disclosure;

FIG. 10 is a schematic structural diagram of a third load field according to embodiments of the present disclosure;

FIG. 11 is a schematic structural diagram of a fourth load field according to embodiments of the present disclosure;

FIG. 12 is a flowchart of a method for decrypting data according to embodiment, of the present disclosure;

FIG. 13 is a schematic structural diagram of an apparatus for encrypting data according to embodiments of the present disclosure; and FIG. 14 is a schematic structural diagram of an apparatus for encrypting according to embodiments of the present disclosure.

Through the above drawings, explicit embodiments of the present disclosure have been shown, and will be described in more detail later. These drawings and text descriptions are not intended to limit the scope of the concept of the present disclosure in any form, but to explain the concepts of the present disclosure to those skilled in the art by referring to specific embodiments.

DETAILED DESCRIPTION

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

Figure 1:
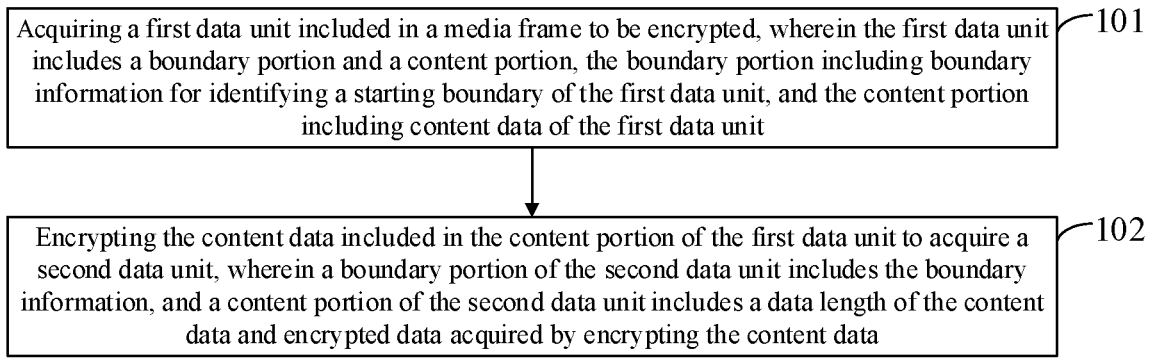
FIG. 1 is a flowchart of a method for encrypting data according to embodiments of the present disclosure.

Referring to FIG. 1, an embodiment of the present disclosure provides a method for encrypting data. The method includes the following steps.

In step 101, a first data unit included in a media frame to be encrypted is acquired, wherein the first data unit includes a boundary portion and a content portion. The boundary portion includes boundary information for identifying a starting boundary of the first data unit, and the content portion includes content data of the first data unit.

By the boundary information in the boundary portion in the first data unit, each first data unit in the media frame to be encrypted may be identified and the content portion in each first data unit may be further identified.

In step 102, the content data included in the content portion of the first data unit is encrypted to acquire a second data unit, wherein a boundary portion of the second data unit includes the boundary information, and a content portion of the second data unit includes a data length of the content data and encrypted data acquired by encrypting the content data.

In this step, the content data in each first data unit in the media frame to be encrypted is encrypted. After the content data in the first data unit is encrypted to acquire the encrypted data, the content data in the first data unit is automatically updated to the data length of the content data and the encrypted data to form the second data unit.

In related art, encryption of the audio and video data is essentially encryption of audio and video data frames. For any audio and video data frame, data of M bytes may be selected from the audio and video data frame every other fixed bytes. The selected data of M bytes is encrypted to achieve encryption of the entire audio and video data frame. The value of M may be an integer such as 8, 16, or 32. In the encryption solution, the data of M bytes is selected in the audio and video data frame every other fixed bytes for encryption, and content of the audio and video data frame is still substantially unencrypted and security is still low.

In the embodiment of the present disclosure, the content portion in the first data unit can be determined by the boundary information, and all content data in the content portion in each first data unit can be further encrypted, thereby improving the data security. In addition, during encryption of the first data unit, only the content portion of the first data unit is encrypted, and the boundary portion of the first data unit is not encrypted. Therefore, the amount of the encrypted data is reduced to the utmost extent and the encryption efficiency is improved to the utmost extent while ensuring sufficient data security.

Figure 2:
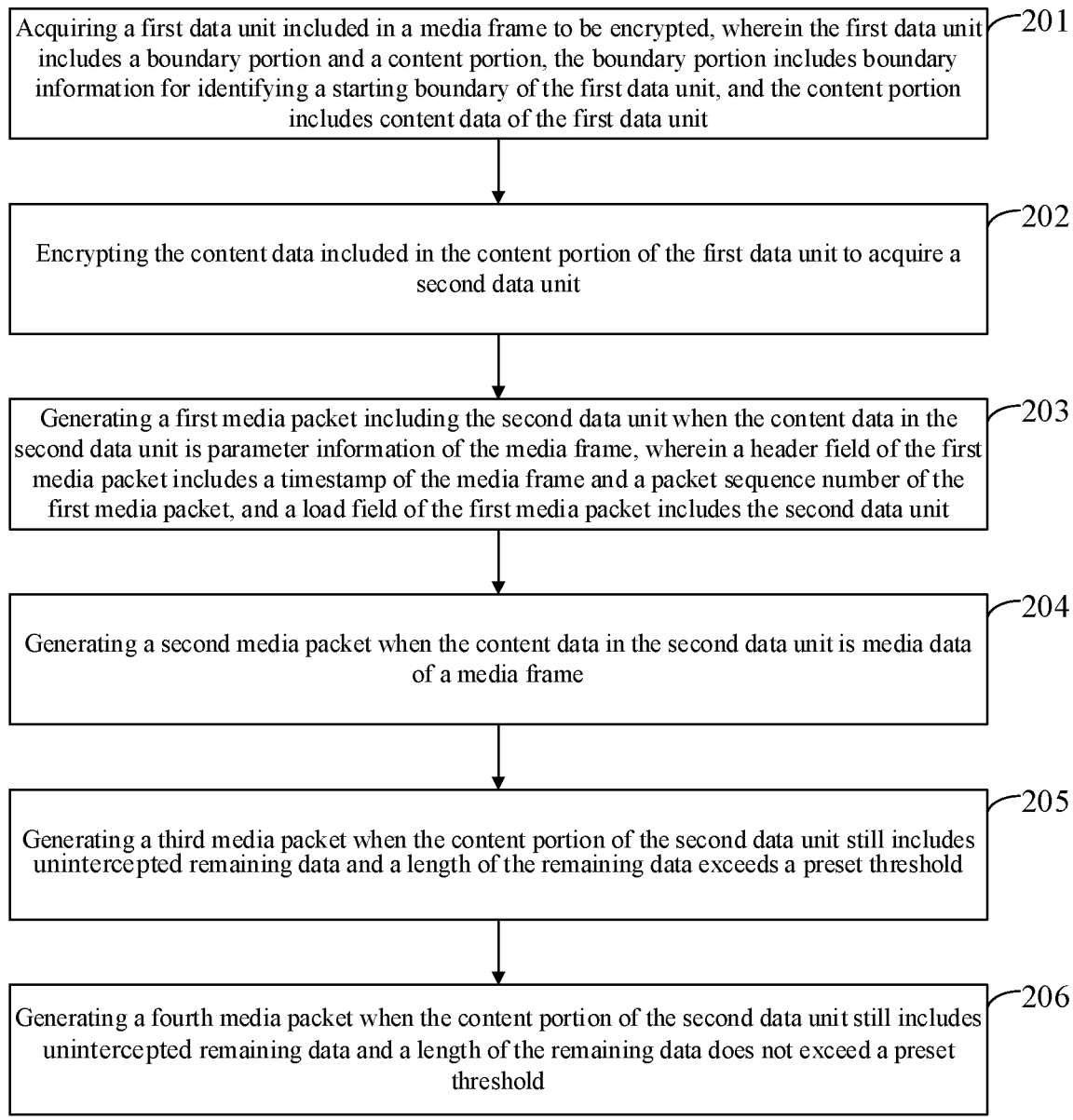
FIG. 2 is a flowchart of a method for encrypting data according to Embodiment 2 of the present disclosure.

Referring to FIG. 2, an embodiment of the present disclosure provides a method for encrypting data. The method includes the following steps.

In step 201, a first data unit included in a media frame to be encrypted is acquired, wherein the first data unit includes a boundary portion and a content portion, the boundary portion includes boundary information for identifying a starting boundary of the first data unit, and the content portion includes content data of the first data unit.

Figure 3:
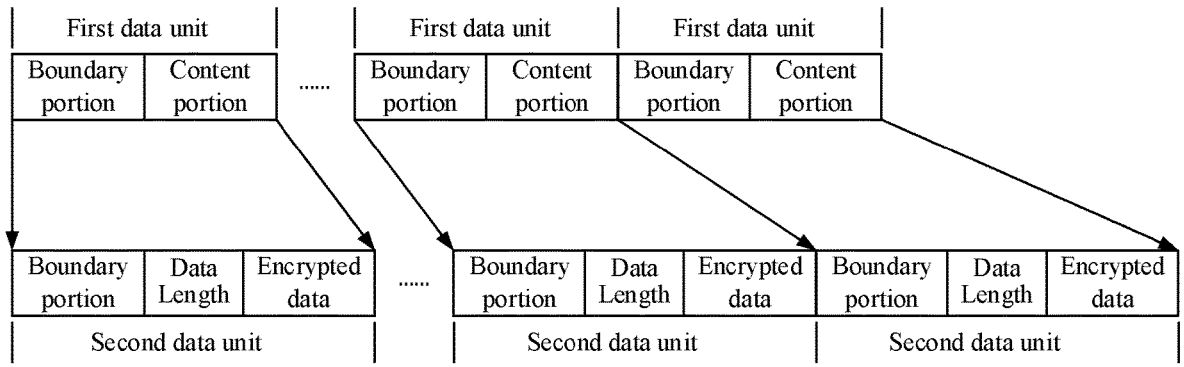

Referring to FIG. 3, FIG. 3 shows the media frame to be encrypted. In this step, the first data units encoded by a camera or an encoder may be acquired, and the acquired first data units are formed into the media frame to be encrypted.

The content data of the first data unit includes two types: parameter information and media data of the media frame, and the media data may be audio and video data or the like. The parameter information of the media frame includes multiple parameters such as a sequence parameter set (SPS), a picture parameter set (PPS), and a video parameter set (VPS). For any first data unit, the content data of the first data unit may be a type of parameter information, or the content data of the first data unit may be media data. Therefore, according to the content data of the first data unit, the first data units may be categorized into different types of data units. Therefore, the first data units may include the following types of data units: a first type of data unit including media data, a second type of data unit including the SPS, a third type of data unit including the PPS, and a fourth type of data unit including the VPS, and the like.

The boundary information includes a starting code and an identification code. Different types of first data units may include the same starting code, but different identification codes.

In this embodiment, the first data unit may be encoded by an H.264 encoding mode or an H.265 encoding mode. The first data unit encoded by the H.264 encoding mode may be formed into a media frame in the H.264 encoding mode, and the first data unit encoded by the H.265 encoding mode may be formed into a media frame in the H.265 encoding mode.

Referring to FIG. 4, for the first data unit encoded by the H.264 encoding mode, the first data unit includes a boundary portion and a content portion. The boundary portion may have a length of five bytes, and a length of the content portion may be set according to actual needs.

The starting code in the first data unit encoded by the H.264 encoding mode may have a length of four bytes, and the identification code may have a length of one byte. The first four bytes of the boundary portion may include the starting code, and the remaining one byte of the boundary portion may include the identification code.

The content data in the first data unit acquired by the H.264 encoding mode includes three types: SPS, PPS, and media data. Therefore, the encoded first data unit may include a first type of data unit, a second type of data unit, and a third type of data unit. The three types of first data units include the same starting code and different identification codes.

Referring to FIG. 4, the media frame in the H.264 encoding mode includes a second type of data unit, a third type of data unit, and at least one first type of data unit. In the media frame in the H.264 encoding mode, the second type of data unit is located before the third type of data unit, and the third type of data unit is located before each first type of data unit in the at least one first type of data unit.

The boundary portion of the second type of data unit includes a starting code and a first identification code, and the content portion includes the SPS. For example, the starting code may be values such as 00 00 00 01, 00 00 00 02, or 00 00 00 03. The first identification code may be a value such as 67, 57, or 47.

The boundary portion of the third type of data unit includes a starting code and a second identification code, and the content portion includes the PPS. For example, the second identification code may be a value such as 68, 58 or 48.

The boundary portion of the first type of data unit includes a starting code and a third identification code, and the content portion includes the media data. For example, the third identification code may be a value such as 65, 55, or 45.

Referring to FIG. 5, for the first data unit encoded by the H.265 encoding mode, the first data unit includes a boundary portion and a content portion. The boundary portion may have a length of six bytes, and a length of the content portion may be set according to actual needs.

The starting code in the first data unit acquired by the H.265 encoding mode may have a length of four bytes, and the identification code may have a length of length of two bytes. The first four bytes of the boundary portion may include the starting code, and the remaining two bytes of the boundary portion may include the identification code.

The content data in the first data unit acquired by the H.265 encoding mode includes four types: VPS, SPS, PPS, and media data. Therefore, the encoded first data unit may include a first type of data unit, a second type of data unit, a third type of data unit, and a fourth type of data unit. The four types of first data units include the same starting code, but different identification codes.

Referring to FIG. 5, the media frame in the H.265 encoding mode includes a fourth type of data unit, a third type of data unit, a second type of data unit, and at least one first type of data unit. In the media frame in the H.265 encoding mode, the fourth type of data unit is located before the second type of data unit, the second type of data unit is located before the third type of data unit, and the third type of data unit is located before each first type of data unit in the at least one first type of data unit.

The boundary portion of the second type of data unit includes a starting code and a first identification code, and the content portion includes the SPS. For example, the starting code may be values such as 00 00 00 01, 00 00 00 02, or 00 00 00 03. The first identification code may be a value such as 4201, 3201, or 2201.

The boundary portion of the third type of data unit includes a starting code and a second identification code, and the content portion includes the PPS. For example, the second identification code may be a value such as 4401, 3401, or 2401.

The boundary portion of the fourth type data unit includes a starting code and a fourth identification code, and the content portion includes the VPS. For example, the fourth identification code may be a value such as 4001, 3001, or 2001.

The boundary portion of the first type of data unit includes a starting code and a third identification code, and the content portion includes the media data. Optionally, the third identification code may be a value such as 2601, 3601, or 4601.

In step 202, the content data included in the content portion of the first data unit is encrypted to acquire a second data unit.

For example, one piece of boundary information in the first data unit may be identified at first, and then the data from such boundary information to the next boundary information may be identified as the content data. The boundary information of each first data unit includes the starting code, and the starting code is preset fixed information, for example, the starting code may be a preset fixed value. In this way, the starting position of the boundary portion of each first data unit can be identified from the media frame according to the starting code, thereby dividing the media frame into the first data units one by one. Since the boundary portion of the first data unit is a fixed length, the starting position of the content portion of the first data unit can be determined according to the starting position of the boundary portion and the fixed length, to acquire the starting position of the content data of the first data unit, thereby acquiring the content data of the first data unit.

Referring to FIG. 3, the content data included in each first data unit is encrypted to acquire a second data unit corresponding to each first data unit. The boundary portion of the second data unit includes the boundary information of the first data unit. The content portion of the second data unit includes a data length of the content data in the first data unit and encrypted data acquired by encrypting the content data. Besides, in the second data unit, the data length is located between the boundary information and the encrypted data, and the data length of the content data may be the same as or different from the data length of the encrypted data.

For example, in the second data unit, the data length may occupy a unit length of four bytes, three bytes, five bytes, or the like.

The content data included in the content portion of each first data unit in the media frame to be encrypted is encrypted to acquire the second data unit corresponding to each first data unit, and all acquired second data units are formed into the encrypted media frame.

Referring to FIG. 4, for the media frame formed by the H.264 encoding mode, the media frame includes a first type of data unit, a second type of data unit, and a third type of data unit.

During encryption of the second type of data unit, the content data included in the content portion of the second type of data unit and the first data length of the content data are acquired. The content data is SPS, and the SPS is encrypted to acquire the first encrypted data, and then the SPS included in the content portion of the second type data unit is replaced with the first data length and the first encrypted data to acquire the second data unit.

During encryption of the third type of data unit, the content data included in the content portion of the third type data unit and the second data length of the content data are acquired. The content data is PPS, and the PPS is encrypted to acquire second encrypted data, and then the PPS included in the content portion of the third type of data unit is replaced with the second data length and the second encrypted data to acquire the second data unit.

During encryption of the first type of data unit, the content data included in the content portion of the first type of data unit and the third data length of the content data are acquired. The content data is media data, and the media data is encrypted to acquire third encrypted data, and then the media data included in the content portion of the first type of data unit is replaced with the third data length and the third encrypted data to acquire the second data unit.

Referring to FIG. 5, for the media frame formed by the H.265 encoding mode, the media frame includes a first type of data unit, a second type of data unit, a third type of data unit, and a fourth type of data unit.

During encryption of the fourth type of data unit, the content data included in the content portion of the fourth type of data unit and the fourth data length of the content data are acquired. The content data is VPS, and the VPS is encrypted to acquire fourth encrypted data, and then the VPS included in the content portion of the fourth type of data unit is replaced with the fourth data length and the fourth encrypted data to acquire the second data unit.

During encryption of the second type of data unit, the content data included in the content portion of the second type of data unit and the first data length of the content data are acquired, the content data is SPS, and the SPS is encrypted to acquire first encrypted data, and then the SPS included in the content portion of the second type of data unit is replaced with the first data length and the first encrypted data to acquire the second data unit.

During encryption of the third type of data unit, the content data included in the content portion of the third type of data unit and the second data length of the content data are acquired. The content data is PPS, and the PPS is encrypted to acquire second encrypted data, and then the PPS included in the content portion of the third type of data unit is replaced with the second data length and the second encrypted data to acquire the second data unit.

During encryption of the first type of data unit, the content data included in the content portion of the first type of data unit and the third data length of the content data are acquired. The content data is media data, and the media data is encrypted to acquire third encrypted data, and then the media data included in the content portion of the first type data unit is replaced with the third data length and the third encrypted data to acquire the second data unit.

In this embodiment, all content data in the content portion in each first data unit is encrypted, thereby improving data security. Since the starting code and the identification code in each first data unit are both preset information, not all the boundary information in the boundary portion in each first data unit needs to be encrypted, thereby improving the encryption efficiency.

After each first data unit in the media frame is encrypted into the second data unit, each second data unit in the media frame may be packed to acquire a media packet, and the acquired media packets are formed into a data stream. The media packet may be a real-time transport protocol (RTP) packet and the like.

Referring to FIG. 6, the media packet includes a header field and a load field, and may further include a padding field (not shown in the drawing) and the like.

The structures of the header fields of the media packets defined by the H.264 encoding mode and the H.265 encoding mode may be the same, but the structures of the defined load fields are different. The load field defined in the H.264 encoding mode includes two types: a first load field and a second load field. The load field in the H.265 encoding mode includes two types: a third load field and a fourth load field.

Referring to FIG. 7, the header field includes a packet sequence field, a timestamp field, and the like. The packet sequence field includes a sequence number of the media packet, and the timestamp field includes a timestamp of the media frame.

Referring to FIG. 8, the first payload field includes a type field, a payload field, and the like. Referring to FIG. 9, the second load field includes an indicator (FU indicator), a header (FU header), and a payload field (FU payload). Referring to 10, the third load field includes a header (PayloadHdr) and a payload field (Payload). Referring to 11, the fourth payload field includes a load header field (PayloadHdr), a header (FU header) and a payload field (FU payload).

Each second data unit may be packed into one or more media packets. For the second data unit corresponding to the second type of data unit, the second data unit corresponding to the third type of data unit, and the second data unit corresponding to the fourth type of data unit, the amount of data of each of the three types of second data units is small, so each second data unit may be packed into a media packet of which the load field is the first load field or the third load field. For the second data unit corresponding to the first type of data unit, since the amount of data of the second data unit is usually large, the second data unit may be packed into one or more media packets of which the load field is the second load field or the fourth load field.

The first two second data units or the first three second data units in the encrypted media frame are the second data unit corresponding to the second type of data unit, the second data unit corresponding to the third type of data unit and/or the second data unit corresponding to the fourth type of data unit, so the first two second data units or the first three second data units in the media frame may be packed into the media packet of which the load field is the first load field or third load field according to the operation of the following step 203.

The second data unit corresponding to the first type of data unit in the encrypted media frame may be packed into the media packet of which the load field is the second load field or the fourth load field according to the operation of the following step 204.

In step 203, a first media packet including the second data unit is generated when the content data in the second data unit is parameter information of the media frame, wherein a header field of the first media packet includes a timestamp of the media frame and a packet sequence number of the first media packet, and a load field of the first media packet includes the second data unit.

For the second data unit of which the content data is parameter information of the media frame, the identification code included in the boundary information in the second data unit is a first identification code, a second identification code, or a fourth identification code. Therefore, for any second data unit in the media frame, when the identification code included in the boundary information of the second data unit is the first identification code, the second identification code, or the fourth identification code, the content in the second data unit may be determined as the parameter information of the media frame, and then the second data unit is packed into a first media packet by the operation of this step.

The load field of the first media packet may include an identification code in the boundary portion of the second data unit and a content portion of the second data unit. The content portion of the second data unit includes a data length and encrypted data. Since the starting code included in the boundary portion of the second data unit is preset fixed information, and the starting code of each second data unit is the same, the load field of the first media packet may not include the starting code in the boundary portion of the second data unit.

Referring to FIG. 8, for the media frame in the H.264 encoding mode, the content data of the first two second data units of the media frame is parameter information of the media frame, so for any one of the two second data units, the first media packet is generated. The header field of the first media packet includes a timestamp of the media frame and a packet sequence number of the first media packet. The payload field in the first load field of the first media packet includes an identification code in the boundary portion of the second data unit and data in the content portion.

Referring to FIG. 10, for the media frame in the H.265 encoding mode, the content data of the first three second data units of the media frame is parameter information of the media frame, so for any one of the three second data units, a first media packet is generated. The header field of the first media packet includes a timestamp of the media frame and a packet sequence number of the first media packet. The payload field in a third load field of the first media packet includes an identification code in the boundary portion of the second data unit and data in the content portion.

In step 204, when the content data in the second data unit is media data of a media frame, a second media packet is generated.

For the second data unit of which the content data is the media data of a media frame, the identification code included in the boundary information in the second data unit is a third identification code. Therefore, for any second data unit in the media frame, when the identification code included in the boundary information of the second data unit is the third identification code, the content in the second data unit may be determined as the media data of the media frame. Furthermore, the second data unit is packed into the media packet by the operation of this step.

The header field of the second media packet includes a timestamp of the media frame and a packet sequence number of the second media packet. The load field of the second media packet includes the first identification information for identifying the second media packet as a starting packet, boundary information of the second data unit, and part of data intercepted from a starting position of the content portion of the second data unit.

The amount of data of the second data unit including media data is often large, and may be packed into multiple media packets. The packet type of the packed first media packet is the starting packet, called as a second media packet for convenience of explanation. The packet type of the media packet packed before the last media packet is an intermediate packet, called as a third media packet for convenience of explanation. The packet type of the last packed media packet is the ending packet, called as a fourth media packet for convenience of explanation.

Referring to FIG. 9, for the media frame in the H.264 encoding mode, from the third second data unit of the media frame, the content data included in each second data unit is media data, so for each second data unit, the identification code in the boundary information of the second data unit includes a first part of content and a second part of content, and the first part of content and the second part of content are two different parts of the identification code. A part of data is acquired from the starting position of the content portion in the second data unit to generate a second media packet. The header field of the second media packet includes the timestamp of the media frame and the packet sequence number of the second media packet. The load field of the second media packet is a second payload field. The indicator of the second load field includes the first part of content. The header of the second load field includes the second part of content and the first identification information. The first identification information is configured to identify the second media packet as the starting packet, and the payload field in the second load field includes the intercepted part of data.

Optionally, a part of bits existing in the indicator of the second load field include the first part of content, a part of bits existing in the header of the second load field include the second part of content, and the remaining bits in the header include the first identifier information.

It is assumed that the first part of content may be the content of the first three bits in the identification code, and the second part of content may be the content of the last five bits in the identification code. For example, the first three bits included in the indicator may include the first part of content, the first three bits included in the header may include the first identification information, and the remaining five bits in the header may include the second part of content.

For example, the first identification information may have a length of two bits or three bits. When the first identification information has two bits, any two of the first three bits included in the header include the first identification information.

Referring to FIG. 11, for the media frame in the H.265 encoding mode, from the fourth second data unit of the media frame, the content data included in each second data unit is media data. Therefore, for each second data unit, a part of data is intercepted from the starting position of the content portion in the second data unit to generate a second media packet. The header field of the second media packet includes a timestamp of the media frame and a packet sequence number of the second media packet. The load field of the second media packet is the fourth load field. The header of the fourth payload field includes part of content in the first byte of the identification code and the first identification information. The first identification information is configured to identify the second media packet as a starting packet, and the payload field in the fourth load field includes the intercepted part of data.

Optionally, a part of bits existing in the header of the fourth load field include a part of content in the first byte of the identification code, and the remaining bits in the header include the first identification information.

For example, the first two bits of the header of the fourth load field may include the first identification information, and the remaining six bits of the header may include the content of the middle six bits of the first byte of the identification code.

The values of the middle six bits of the first byte include 1 and 0, the values of the other two bits of the first byte are 0, and the value of each bit in the second byte of the identification code is also 0. Therefore, the header of the fourth load field includes part of content in the first byte of the identification code.

In step 205, when the content portion of the second data unit still includes unintercepted remaining data, and a length of the remaining data exceeds a preset threshold, a third media packet is generated, wherein a header field of the third media packet includes a timestamp of the media frame and a packet sequence number of the third media packet, and a load field of the third media packet includes second identification information for identifying the third media packet as an intermediate packet and the part of data intercepted from the starting position of the remaining data.

Specifically, whether the length of the unintercepted remaining data included in the content portion of the second data unit exceeds the preset threshold is determined. If the length of the remaining data exceeds the preset threshold, then part of data is intercepted from the starting position of the remaining data. The third media packet is generated, and the operation of determining whether a length of unintercepted remaining data included in the content portion of the second data unit exceeds a preset threshold is performed again. If the length of the remaining data does not exceed the preset threshold, step 206 is performed.

Referring to FIG. 9, for the media frame in the H.264 encoding mode, a part of data is intercepted from the starting position of the unintercepted remaining data included in the content portion of the second data unit to generate a third media packet. The header field of the third media packet includes a timestamp of the media frame and a packet sequence number of the third media packet. The load field of the third media packet is the second load field, and the header of the second load field includes the second identifier Information. The second identification information is configured to identify the second media packet as an intermediate packet, and the payload field in the second payload field includes the intercepted part of data.

For example, the first three bits included in the header may include third identification information. The third identification information may have a length of two bits or three bits. When the third identification information has two bits, any two of the first three bits included in the header include the third identification information.

Referring to FIG. 11, for the media frame in the H.265 encoding mode, a part of data is intercepted from the starting position of the unintercepted remaining data included in the content portion of the second data unit to generate a third media packet. The header field of the third media packet includes a timestamp of the media frame and a packet sequence number of the third media packet. The load field of the third media packet is a fourth load field. The fourth load field includes the second identification information and the intercepted part of data, and the second identification information is configured to identify the third media packet as an intermediate packet.

The first two bits of the header of the fourth load field include second identification information, the second identification information is configured to identify the third media packet as an intermediate packet, and the payload field in the fourth payload field includes the intercepted part of data.

At least one third media packet is generated according to the method of this step until the unintercepted remaining data in the second data unit is enough to generate one media packet, that is, when the data length of the remaining data does not exceed the preset threshold, step 206 is performed as follows.

In step 206, when the content portion of the second data unit still includes unintercepted remaining data and a length of the remaining data does not exceed a preset threshold, a fourth media packet is generated, wherein a header field of the fourth media packet includes a timestamp of the media frame and a packet sequence number of the fourth media packet, and a load field of the fourth media packet includes third identification information for identifying the fourth media packet as an ending packet and the remaining data.

Referring to FIG. 9, for the media frame in the H.264 encoding mode, the unintercepted remaining data included in the content portion in the second data unit is acquired to generate the fourth media packet. The header field of the fourth media packet includes a timestamp of the media frame and a packet sequence number of the fourth media packet. The load field of the fourth media packet is a second load field. The header of the second load field includes third identification information, and the third identification information is configured to identify the fourth media packet as the ending packet, and the payload field in the fourth load field includes the remaining data.

Optionally, the first three bits included in the header may include third identification information.

Referring to FIG. 11, for the media frame in the H.265 encoding mode, the unintercepted remaining data included in the content portion in the second data unit is acquired to generate a fourth media packet, and the header field of the fourth media packet includes a timestamp of the media frame and a packet sequence number of the fourth media packet. The load field of the fourth media packet is a fourth load field. The header of the fourth load field includes third identification information, and the third identification information is configured to identify the fourth media packet as the ending packet, and the payload field in the fourth load field includes the remaining data.

For example, the first two bits of the header may include the second identification information.

Each second data unit in the media frame to be encrypted is packed into at least one media packet according to the operations of 203 to 206 above, and then the at least one media packet is formed into a media stream, and the media stream can be transmitted on the network.

In the embodiment of the present disclosure, the content data in each first data unit in the media frame to be encrypted is encrypted, so that the data security can be improved. During encryption, not all the boundary information in each first data unit is encrypted, thereby improving the encryption efficiency. The encrypted second data unit includes the data length of the content data of the first data unit, so that the encrypted data can be decrypted during decryption. During packetization of the second data into a media packet, the starting code in the boundary information is not packed, thereby reducing the amount of data of the media packet and reducing the data transmission amount.

Referring to FIG. 12, an embodiment of the present disclosure provides a method for decrypting data. The method is configured to decrypt a data stream encrypted in Embodiment 2. The method includes:

In step 301, media packets included in the same media frame are acquired from the received data stream.

The data stream includes multiple media packets, and the header field of each media packet includes a timestamp of the media frame to which the media packet belongs. Therefore, in this step, the timestamp corresponding to each media packet can be acquired from the header field of each media packet, and all media packets with the same timestamp are used as the media packets included in one media frame.

In step 302, the media packets included in the media frame are parsed to acquire a second data unit included in the media frame.

The media packets in the media frame include a first media packet, a second media packet, a third media packet, and a fourth media packet.

This step may be performed through the following sub-steps:

Step 3021: the packet sequence number of each media packet is respectively acquired from the header field of each media packet included in the media frame, and all the media packets are sorted in an ascending order according to the packet sequence numbers of the media packets.

3022: The first media packet, the second media packet, the fourth media packet, and the third media packet located between the second media packet and the fourth media packet are acquired from the sorted media packets. The media packets located between the second media packet and the fourth media packet are all third media packets.

Optionally, if the media frame is a media frame in the H.264 encoding mode, the frontmost first media packet and second media packet are acquired from the sorted media packet sequence to acquire two first media packets, and the two first media packets are a first media packet corresponding to a second data unit of which the content data is SPS and a first media packet corresponding to a second data unit of which the content data is PPS respectively. The media packets from the third media packet to the last media packet in the media packet sequence are divided into at least one sub-media packet sequence. The media packets in the sub-media packet sequence are all media packets corresponding to one second data unit. The content data of the second data unit is media data. For each sub-media packet sequence, the first media packet in the sub-media packet sequence includes first identification information, that is, the first media packet is a starting packet. The last media packet in the sub-media packet sequence includes third identification information, that is, the last media packet is the ending packet. Each other media packet in the sub-media sequence includes the second identification information, that is, each other media packet is an intermediate packet. For any sub-media packet sequence, the sub-media packet sequence corresponds to a second data unit of which the content data is the media data. The first media packet including the sub-media packet sequence is a second media packet. The last media packet of the sub-media packet sequence is a fourth media packet, and at least one other media packet of the sub-media packet sequence is a third media packet. Therefore, a second media packet, at least one third media packet, and a fourth media packet which correspond to the second data unit are acquired.

Optionally, if the media frame is a media frame in the H.265 encoding mode, the frontmost first media packet, second media packet, and third media packet are acquired from the sorted media packet sequence to acquire three first media packets. The three first media packets are a first media packet corresponding to the second data unit of which the content data is VPS, a first media packet corresponding to the second data unit of which the content data is SPS, and a first media packet corresponding to the second data unit of which the content data is PPS respectively. The media packets from the fourth media packet to the last media packet in the media packet sequence are divided into at least one sub-media packet sequence, and the media packets in the sub-media packet sequence are all media packets corresponding to one second data unit. The content data of the second data unit is media data. For each sub-media packet sequence, the first media packet in the sub-media packet sequence includes first identification information, that is, the first media packet is a starting packet. The last media packet in the sub-media packet sequence includes third identification information, that is, the last media packet is an ending packet. Each other media packet in the sub-media sequence includes the second identification information, that is, each other media packet is an intermediate packet. For any sub-media packet sequence, the sub-media packet sequence corresponds to a second data unit of which the content data is media data. The first media packet of the sub-media packet sequence is a second media packet. The last media packet of the sub-media packet sequence is a fourth media packet. At least one other media packet of the sub-media sequence is a third media packet. Therefore, a second media packet, at least one third media packet, and a fourth media packet which correspond to the second data unit are acquired.

Step 3023: the first media packet is parsed to form a second data unit corresponding to the first media packet, and the second media packet, the third media packet, and the fourth media packet are parsed to form a second data unit, thereby acquiring each second data unit included in the media frame.

If the media frame is a media frame in the H.264 encoding mode, two first media packets are included. One first media packet is parsed to acquire the first identification code and content data, and the preset starting code, the identification code and the content data are formed into a second data unit of which the content data is SPS. The other first media packet is parsed to acquire a second identification code and content data, and the preset starting code, the second identification code, and the content data are formed into a second data unit of which the content data is PPS. For a second media packet, at least one third media packet, and a fourth media packet which correspond to the second data unit of which the content data is media data, the second media packet is parsed to acquire boundary information and part of content data of the second data unit. The boundary information includes a first part and a second part of the identification code, and the preset starting code, the first part and the second part are formed into the new boundary information. For each third media packet, the third media packet is parsed to acquire part of content data of the second data unit, and the fourth media packet is parsed to acquire part of content data of the second data unit. The new boundary information and the parsed each part of content data of the second data unit are formed into a second data unit.

If the media frame is a media frame in the H.265 encoding mode, three first media packets are included. One first media packet is parsed to acquire a fourth identification code and content data. The preset starting code, the fourth identification code and the content data are formed into a second data unit of which the content data is VPS. Another first media packet is parsed to acquire the first identification code and content data, and a preset starting code, the first identification code, and the content data are formed into a second data unit of which the content data is SPS. The last first media packet is parsed to acquire a second identification code and content data, and a preset starting code, the second identification code, and the content data are formed into a second data unit of which the content data is PPS. For a second media packet, at least one third media packet, and a fourth media packet which correspond to the second data unit of which the content data is media data, the second media packet is parsed to acquire boundary information and part of content data of the second data unit, and the boundary information is incomplete boundary information, including only the middle six bits of the first byte in the identification code. The other two bits of the first byte and each bit of the second byte of the identification code are supplemented to acquire a complete identification code, and the preset starting code and the complete identification code are formed into new boundary information. For each third media packet, the third media packet is parsed to acquire part of content data of the second data unit, and the fourth media packet is parsed to acquire part of content data of the second data unit. The new boundary information and the parsed each part of content data of the second data unit are formed into a second data unit.

In step 303, each second data unit in the media frame is decoded to acquire each first data unit in the media frame.

For any second data unit, the data length N and the encrypted data located after the data length are acquired from the content portion of the second data unit, and the encrypted data is decrypted to acquire the decrypted data. The front N-length data is extracted from the decrypted data, and the data in the content portion of the second data unit is updated to be the extracted data to acquire the first data unit.

The following is apparatus embodiments of the present disclosure, which can be configured to implement the method embodiments of the present disclosure. The method embodiments of the present disclosure can be referred for the details not disclosed in the apparatus embodiments of the present disclosure.

Referring to FIG. 13, an embodiment of the present disclosure provides an apparatus 400 for encrypting data. The apparatus 400 includes:

an acquiring module 401, configured to acquire a first data unit included in a media frame to be encrypted, wherein the first data unit includes a boundary portion and a content portion, the boundary portion including boundary information for identifying a starting boundary of the first data unit, and the content portion including content data of the first data unit; and an encrypting module 402, configured to encrypt the content data included in the content portion of the first data unit to acquire a second data unit, wherein a boundary portion of the second data unit includes the boundary information, and a content portion of the second data unit includes a data length of the content data and encrypted data acquired by encrypting the content data.

Optionally, the apparatus 400 further includes:

a first generating module, configured to generate a first media packet including the second data unit when the content data is parameter information of the media frame, wherein a header field of the first media packet includes a timestamp of the media frame and a packet sequence number of the first media packet, and a load field of the first media packet includes the second data unit.

Optionally, the load field of the first media packet includes an identification code in the boundary information and the content portion of the second data unit.

Optionally, the apparatus 400 further includes a second generating module, configured to generate a second media packet when the content data is media data of the media frame, wherein a header field of the second media packet includes a timestamp of the media frame and a packet sequence number of the second media packet, and a load field of the second media packet includes first identification information for identifying the second media packet as a starting packet, the boundary information and a part of data intercepted from a starting position of the content portion of the second data unit.

Optionally, the load field of the second media packet includes an indicator, a header and a payload field, the header is located between the indicator and the payload field, and the boundary information includes an identification code including a first part of content and a second part of content;

wherein the indicator includes the first part of content, the header includes the second part of content and the first identification information, and the payload field includes the part of data intercepted from the starting position of the content portion of the second data unit.

Optionally, the load field of the second media packet includes a header and a payload field, the header is located before the payload field, and the boundary information includes an identification code;

wherein the header includes the middle 6-bit content of a first byte of the identification code and the first identification information, and the payload field includes the part of data intercepted from the starting position of the content portion of the second data unit.

Optionally, the apparatus 400 further includes:

an intercepting module, configured to, when a length of unintercepted remaining data included in the content portion of the second data unit exceeds a preset threshold, intercept a part of data from the starting position of the remaining data; and a third generating module, configured to generate a third media packet, wherein a header field of the third media packet includes a timestamp of the media frame and a packet sequence number of the third media packet, and a load field of the third media packet includes second identification information for identifying the third media packet as an intermediate packet and the intercepted part of data.

Optionally, the apparatus 400 further includes:

a fourth generating module, configured to, when a length of unintercepted remaining data included in the content portion of the second data unit does not exceed a preset threshold, generate a fourth media packet, wherein a header field of the fourth media packet includes a timestamp of the media frame and a packet sequence number of the fourth media packet, and a load field of the fourth media packet includes third identification information for identifying the fourth media packet as an ending packet and the remaining data.

Optionally, the apparatus 400 further includes: a determining module, configured to determine whether a length of unintercepted remaining data included in the content portion of the second data unit exceeds a preset threshold. When it is determined that the length exceeds the preset threshold, the intercepting module is triggered to operate, and the fourth generating module is triggered to operate if it is determined that the length does not exceeds the preset threshold.

Optionally, after the third generating module generates the third media packet, the determining module is triggered to perform the operation of determining whether the length of the unintercepted remaining data included in the content portion of the second data unit exceeds the preset threshold.

In the embodiment of the present disclosure, the content data in each first data unit in the media frame to be encrypted is encrypted, such that the data security can be improved. During encryption, not all the boundary information in each first data unit is encrypted, and the encryption efficiency is improved. The encrypted second data unit includes the data length of the content data of the first data unit, so that the encrypted data can be decrypted during decryption. During packetization of the second data unit into the media packet, the starting code in the boundary information is not packed, thereby reducing the amount of data of the media packet and reducing the data transmission amount.

With regard to the apparatus in the aforesaid embodiments, the specific manner in which the respective modules perform the operations has been described in detail in embodiments of the method, and may not be explained in detail herein.

FIG. 14 is a block diagram showing an apparatus 500 for use in encrypting data according to an exemplary embodiment. For example, the apparatus 500 may be a mobile phone, a computer, a digital broadcast terminal, a message transceiver device, a game console, a tablet device, a medical device, a fitness device, a personal digital assistant, or the like.

Referring to FIG. 14, the apparatus 500 may include one or more of the following components: a processing component 502, a memory 504, a power component 506, a multimedia component 508, an audio component 510, an input/ output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the apparatus 500, for performing the above-described methods. For example, the non-transitory computer-readable storage medium may be a ROM, a RAM, a CD-ROM, a magnetic tape, a floppy disc, an optical data storage device, or the like.

A non-transitory computer-readable storage medium is provided. The storage medium stores instructions. The instructions, when being executed by a process of the apparatus 500, may cause the apparatus 500 to perform a method for encrypting data. The method includes:

acquiring a first data unit included in a media frame to be encrypted, wherein the first data unit includes a boundary portion and a content portion, the boundary portion including boundary information for identifying a starting boundary of the first data unit, and the content portion including content data of the first data unit; and encrypting the content data included in the content portion of the first data unit to acquire a second data unit, wherein a boundary portion of the second data unit includes the boundary information, and a content portion of the second data unit includes a data length of the content data and encrypted data acquired by encrypting the content data.

Optionally, after encrypting the content data included in the content portion of the first data unit to acquire the second data unit, the method further includes:

generating a first media packet including the second data unit when the content data is parameter information of the media frame, wherein a header field of the first media packet includes a timestamp of the media frame and a packet sequence number of the first media packet, and a load field of the first media packet includes the second data unit.

Optionally, the load field of the first media packet includes an identification code in the boundary information and the content portion of the second data unit.

Optionally, after encrypting the content data included in the content portion of the first data unit to acquire the second data unit, the method further includes:

generating a second media packet if the content data is media data of the media frame, wherein a header field of the second media packet includes a timestamp of the media frame and a packet sequence number of the second media packet, and a load field of the second media packet includes first identification information for identifying the second media packet as a starting packet, the boundary information and a part of data intercepted from a starting position of the content portion of the second data unit.

Optionally, the load field of the second media packet includes: an indicator, a header and a payload field, the header is located between the indicator and the payload field, and the boundary information includes an identification code including a first part of content and a second part of content;

wherein the indicator includes the first part of content, the header includes the second part of content and the first identification information, and the payload field includes the part of data intercepted from the starting position of the content portion of the second data unit.

Optionally, the load field of the second media packet includes a header and a payload field, the header is located before the payload field, and the boundary information includes an identification code;

wherein the header includes the middle 6-bit content of a first byte of the identification code and the first identification information, and the payload field includes the part of data intercepted from the starting position of the content portion of the second data unit.

Optionally, after generating the second media packet, the method further includes:

if a length of unintercepted remaining data included in the content portion of the second data unit exceeds a preset threshold, intercepting a part of data from the starting position of the remaining data to generate a third media packet, wherein a header field of the third media packet includes a timestamp of the media frame and a packet sequence number of the third media packet, and a load field of the third media packet includes second identification information for identifying the third media packet as an intermediate packet and the intercepted part of data.

Optionally, after generating the second media packet, the method further includes:

if a length of unintercepted remaining data included in the content portion of the second data unit does not exceed a preset threshold, generating a fourth media packet, wherein a header field of the fourth media packet includes a timestamp of the media frame and a packet sequence number of the fourth media packet, and a load field of the fourth media packet includes third identification information for identifying the fourth media packet as an ending packet and the remaining data.

In the embodiment of the present disclosure, the content portion in the first data unit can be determined through the boundary information, and then the content data in each first data unit in the media frame to be encrypted can be further encrypted, thereby improving the data security.

Other embodiments of the present disclosure may be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It may be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for encrypting data, comprising:
acquiring a first data unit included in a media frame to be encrypted, wherein the first data unit comprises a boundary portion and a content portion, the boundary portion comprises boundary information for identifying a starting boundary of the first data unit, and the content portion comprises content data of the first data unit; and
encrypting the content data included in the content portion of the first data unit to acquire a second data unit, wherein a boundary portion of the second data unit comprises the boundary information, and a content portion of the second data unit comprises a data length of the content data and encrypted data acquired by encrypting the content data,
wherein the boundary portion of the second data unit is unencrypted, and the boundary information comprises an identification code which is configured to indicate a type of the content data, the type being parameter information or media data.

2. The method according to claim 1, wherein after encrypting the content data included in the content portion of the first data unit to acquire the second data unit, the method further comprises:
generating a first media packet including the second data unit when the content data is parameter information of the media frame, wherein a header field of the first media packet comprises a timestamp of the media frame and a packet sequence number of the first media packet, and a load field of the first media packet comprises the second data unit.

3. The method according to claim 2, wherein the load field of the first media packet comprises the identification code in the boundary information and the content portion of the second data unit.

4. The method according to claim 1, wherein after encrypting the content data included in the content portion of the first data unit to acquire the second data unit, the method further comprises:
generating a second media packet when the content data is media data of the media frame, wherein a header field of the second media packet comprises a timestamp of the media frame and a packet sequence number of the second media packet, and a load field of the second media packet comprises first identification information for identifying the second media packet as a starting packet, the boundary information and a part of data intercepted from a starting position of the content portion of the second data unit.

5. The method according to claim 4, wherein the load field of the second media packet comprises an indicator, a header and a payload field, the header is located between the indicator and the payload field, and the identification code comprises a first part of content and a second part of content;
wherein the indicator comprises the first part of content, the header comprises the second part of content and the first identification information, and the payload field comprises the part of data intercepted from the starting position of the content portion of the second data unit.

6. The method according to claim 4, wherein the load field of the second media packet comprises a header and a payload field, and the header being located before the payload field;
wherein the header comprises the middle 6-bit content of a first byte of the identification code and the first identification information, and the payload field comprises the part of data intercepted from the starting position of the content portion of the second data unit.

7. The method according to claim 4, wherein after generating the second media packet, the method further comprises:
when a length of unintercepted remaining data included in the content portion of the second data unit exceeds a preset threshold, intercepting a part of data from a starting position of the remaining data to generate a third media packet, wherein a header field of the third media packet comprises a timestamp of the media frame and a packet sequence number of the third media packet, and a load field of the third media packet comprises second identification information for identifying the third media packet as an intermediate packet and the intercepted part of data.

8. The method according to claim 4 wherein after generating the second media packet, the method further comprises:
when a length of unintercepted remaining data included in the content portion of the second data unit does not exceed a preset threshold, generating a fourth media packet, wherein a header field of the fourth media packet comprises a timestamp of the media frame and a packet sequence number of the fourth media packet, and a load field of the fourth media packet comprises third identification information for identifying the fourth media packet as an ending packet and the remaining data.

9. A non-volatile computer-readable storage medium, wherein the non-volatile computer-readable storage medium is configured to store a computer program, and when the computer program is loaded and executed by a processor, the program causes the processor to execute the method according to claim 1.

10. An apparatus for encrypting data, comprising:
one or more processors; and
one or more memories; wherein
the one or more memories is configured to store program codes that when executed by the one or more processors cause the one or more processor to implement the following operations:

acquiring a first data unit included in a media frame to be encrypted, wherein the first data unit comprises a boundary portion and a content portion, the boundary portion comprises boundary information for identifying a starting boundary of the first data unit, and the content portion comprises content data of the first data unit; and
encrypting the content data included in the content portion of the first data unit to acquire a second data unit, wherein a boundary portion of the second data unit comprises the boundary information, and a content portion of the second data unit comprises a data length of the content data and encrypted data acquired by encrypting the content data,
wherein the boundary portion of the second data unit is unencrypted, and the boundary information comprises an identification code which is configured to indicate a type of the content data, the type being parameter information or media data.

11. The apparatus according to claim 10, wherein after encrypting the content data included in the content portion of the first data unit to acquire the second data unit, the program codes are further executed by the one or more processors to implement the following operations:
generating a first media packet including the second data unit when the content data is parameter information of the media frame, wherein a header field of the first media packet comprises a timestamp of the media frame and a packet sequence number of the first media packet, and a load field of the first media packet comprises the second data unit.

12. The apparatus according to claim 11, wherein the load field of the first media packet comprises the identification code and the content portion of the second data unit.

13. The apparatus according to claim 10, wherein after encrypting the content data included in the content portion of the first data unit to acquire the second data unit, the program codes are further executed by the one or more processors to implement the following operations:
generating a second media packet when the content data is media data of the media frame, wherein a header field of the second media packet comprises a timestamp of the media frame and a packet sequence number of the second media packet, and a load field of the second media packet comprises first identification information for identifying the second media packet as a starting packet, the boundary information and a part of data intercepted from a starting position of the content portion of the second data unit.

14. The apparatus according to claim 13, wherein the load field of the second media packet comprises an indicator, a header and a payload field, the header is located between the indicator and the payload field, the identification code comprises a first part of content and a second part of content;
wherein the indicator comprises the first part of content, the header comprises the second part of content and the first identification information, and the payload field comprises the part of data intercepted from the starting position of the content portion of the second data unit.

15. The apparatus according to claim 13, wherein the load field of the second media packet comprises a header and a payload field, and the header being located before the payload field, and the boundary information comprises an identification code;
wherein the header comprises the middle 6-bit content of a first byte of the identification code and the first identification information, and the payload field comprises the part of data intercepted from the starting position of the content portion of the second data unit.

16. The apparatus according to claim 13, wherein after generating the second media packet, the program codes are further executed by the one or more processors to implement the following operations:

when a length of unintercepted remaining data included in the content portion of the second data unit exceeds a preset threshold, intercepting a part of data from a starting position of the remaining data to generate a third media packet, wherein a header field of the third media packet comprises a timestamp of the media frame and a packet sequence number of the third media packet, and a load field of the third media packet comprises second identification information for identifying the third media packet as an intermediate packet and the intercepted part of data.

17. The apparatus according to claim 14, wherein after generating the second media packet, the program codes are further executed by the one or more processors to implement the following operations:

when a length of unintercepted remaining data included in the content portion of the second data unit exceeds a preset threshold, intercepting a part of data from a starting position of the remaining data to generate a third media packet, wherein a header field of the third media packet comprises a timestamp of the media frame and a packet sequence number of the third media packet, and a load field of the third media packet comprises second identification information for identifying the third media packet as an intermediate packet and the intercepted part of data.

18. The apparatus according to claim 15, wherein after generating the second media packet, the program codes are further executed by the one or more processors to implement the following operations:

when a length of unintercepted remaining data included in the content portion of the second data unit exceeds a preset threshold, intercepting a part of data from a starting position of the remaining data to generate a third media packet, wherein a header field of the third media packet comprises a timestamp of the media frame and a packet sequence number of the third media packet, and a load field of the third media packet comprises second identification information for identifying the third media packet as an intermediate packet and the intercepted part of data.

19. The apparatus according to claim 13, wherein after generating the second media packet, the program codes are further executed by the one or more processors to implement the following operations:

when a length of unintercepted remaining data included in the content portion of the second data unit does not exceed a preset threshold, generating a fourth media packet, wherein a header field of the fourth media packet comprises a timestamp of the media frame and a packet sequence number of the fourth media packet, and a load field of the fourth media packet comprises third identification information for identifying the fourth media packet as an ending packet and the remaining data.

20. The apparatus according to claim 14, wherein after generating the second media packet, the program codes are further executed by the one or more processors to implement the following operations:

when a length of unintercepted remaining data included in the content portion of the second data unit does not exceed a preset threshold, generating a fourth media packet, wherein a header field of the fourth media packet comprises a timestamp of the media frame and a packet sequence number of the fourth media packet, and a load field of the fourth media packet comprises third identification information for identifying the fourth media packet as an ending packet and the remaining data.

* * * * *